United States Patent
Vaillant et al.

(10) Patent No.: US 6,385,285 B1
(45) Date of Patent: May 7, 2002

(54) METHOD OF RECONSTRUCTION OF A THREE-DIMENSIONAL IMAGE OF AN ELEMENT OF INTEREST

(75) Inventors: Régis Vaillant, Villebon sur Yvette; Laurent Launay, Remy les Chevreuse; Jean Lienard, Clamart; Francisco Sureda, Chatenay Malabry, all of (FR)

(73) Assignee: GE Medical Systems, S.A. (FR)

( * ) Notice: Subject to any disclaimer, the term of this patent is extended or adjusted under 35 U.S.C. 154(b) by 0 days.

(21) Appl. No.: 09/667,210

(22) Filed: Sep. 21, 2000

(30) Foreign Application Priority Data

Sep. 24, 1999 (FR) .............................. 99 11960

(51) Int. Cl.$^7$ ................................. A61B 6/03
(52) U.S. Cl. .............................. 378/62; 378/4
(58) Field of Search ................ 378/4, 8, 62, 98.11, 378/98.12, 901

(56) References Cited

U.S. PATENT DOCUMENTS 5,671,265 A * 9/1997 Andress .................... 378/98.11
5,724,978 A   3/1998 Tenhoff ................. 128/662.06

FOREIGN PATENT DOCUMENTS

| EP | 0860144 | 8/1998 |
|----|---------|--------|
| FR | 2752975 | 3/1998 |
| WO | 9913432 | 3/1998 |

OTHER PUBLICATIONS

Finet et al, "Parameters that Influence Accuracy and Precision of Quantitative Coronary Arteriography", International Journal of Cardiology Imaging, 12, p. 271–287, 1996.
Gordon et al, "Algebraic Reconstruction Techniques (ART) for Three–Dimensionial Electron Microscopy and X–ray Photography", J. Theo. Biol. (1970) 29 p 471–481.
Deriche et al, "Tracking Line Segments", Image and Vision Computing; vol. 8, No. 4, Nov. 1990, p. 261–269.
Pellot et al, "An Attempt to 3D Reconstruct Vessel Morphology from X–ray Projections and Intravascular Ultrasounds Modeling and Fusion", Computerized Medical Imaging and Graphics, Pergamon Press, NY, vol. 20, No. 3, May 1996, pp. 141–151.
Prause et al, "Geometrically Correct 3D Reconstruction of Coronary Wall and Plaque: Combining Biplane Antiiography and Instravascular Ultrasound", Computers in Cardiology, IEEE, 1996, pp. 325–328.

* cited by examiner

Primary Examiner—David V. Bruce
(74) Attorney, Agent, or Firm—Jay L. Chaskin

(57) ABSTRACT

Method of reconstruction of a three-dimensional image of an element of interest comprises a phase of acquisition of digital radiographic images by rotation of an camera around the organ, a phase of marking the position of the element of interest from image to image, and a phase of reconstruction of the three-dimensional image of the element of interest from acquired images and positions of the element of interest successively located in the successive images.

19 Claims, No Drawings

METHOD OF RECONSTRUCTION OF A THREE-DIMENSIONAL IMAGE OF AN ELEMENT OF INTEREST

CROSS-REFERENCE TO RELATED APPLICATIONS

This application claims priority under 35 USC 119 to French Patent Application No. 99 119610 filed Sep. 24, 1999, the entire contents of which is hereby incorporated by reference.

BACKGROUND OF THE INVENTION

The invention concerns the reconstruction of three-dimensional images and, in particular, the reconstruction of a three-dimensional image of an element of interest like, for example, a vascular stent inserted in an organ such as a vessel.

The invention is applicable advantageously but not limitatively to the medical field.

Vascular expanders ("stents") are placed in coronary arteries to eliminate stenosis of those arteries. A major difficulty resides in control of the correct deployment of the stent in the vessel in order to avoid d problem known as restenosis. At present, in order to check correct deployment, that is, in general, the diameter of the stent in the vessel, ultrasound-based intravascular techniques are used, which require the insertion of an extra catheter, carrying an ultrasound probe and therefore relatively expensive.

The invention is aimed at offering a more satisfactory solution to that problem and proposes furnishing the same information, but from a reconstruction of the three-dimensional image of the stent.

BRIEF DESCRIPTION OF THE INVENTION

The invention therefore proposes a method of reconstruction of a three-dimensional image of an element of interest like, for example, a vascular stent inserted in an organ such as a vessel, comprising a phase of acquisition of digital radiographic images by rotation of an camera around the organ, a phase of marking the position of the element of interest from image to image, and a phase of reconstruction of the three-dimensional image of the element of interest from acquired images and positions of the element of interest successively located in the successive images.

Other advantages and characteristics will appear on examination of particular modes of use of the invention, which are now going to be described in detail.

DETAILED DESCRIPTION OF THE INVENTION

A first phase consists of acquiring a number of digital radiographic images by rotation of a camera of standard structure known per se around a patient, for example, around the patient's chest, the three-dimensional Reconstruction of the image of a vascular stent is placed in a coronary artery is of interest. A number of 10 acquisitions per cardiac cycle for about 10 cycles is a nonlimitative example.

In practice, taking into account the relatively contrasted character of the vascular stent, it does not appear indispensable to undertake in advance the injection of a contrast medium into the vascular system.

A marking of the position of the element of interest from image to Image is then undertaken, preferably in real time. Thus, it is possible to Predict the position of the stent from one image to the next. In addition, collimation means can be adjusted to limit the X-ray dose delivered to the patient. By way of indication, it is possible to use as image to image marking technique ("matching") as described by R. Deriche and O. Fangeras entitled "Tracking Line Segments", *Image and Vision Computing*, Vol. 8, No. 4, November 1990, pages 261–270. The expert may possibly refer to it.

A phase of reconstruction of the three-dimensional image of the element of interest is then carried out. In that connection, two variants are possible.

The first consists of describing the three-dimensional image by a regular grid of elementary volume elements commonly designated by the term "voxel" by the expert. The intensities attributed to each voxel then indicate the probability of the voxel being situated or not in the stent.

Reconstruction of the three-dimensional image can be carried out by means of a standard algebraic iterative algorithm of image reconstruction.

The principle of such algebraic iterative algorithm of image reconstruction is perfectly known by the expert and has previously been the subject of numerous articles, e.g., Gordon, Bender and Herman entitled "Algebraic reconstruction technique for tridimensional electron microscopy and X-ray photography," *Journal of Theol. Biol.* 29, pages 9471 to 781 (1970), and also French Patent Applications Nos. 89 03606 or 89 16906.

The method of reconstruction of a three-dimensional image of an object, such as described in French Patent Application No. 2,752,975, can also be used.

The expert may refer to those documents of the prior art for more information concerning use of the image reconstruction algorithm and/or the camera calibration phase.

After that reconstruction, one can also envisage carrying out a segmentation phase on the reconstructed three-dimensional image in order to filter out its noise and retain solely the useful representation of the stent. In that connection, the expert may, for example, use an algorithmic technique of segmentation such as that described G. Finet and J. Liènard entitled "Parameters that influence accuracy and precision of quantitative coronary arteriography," *The International journal of Cardiac Imaging*, Vol. 12, No. 4, December 1996, pages 271–287.

One can also envisage reconstructing the three-dimensional image of the stent by selecting only the images corresponding to a precise instant of the cardiac cycle. In that regard, a physiological signal such as an electrocardiogram can be used to make the selection of those images.

In a second variant, reconstruction of the three-dimensional image can be made by describing the stent by means of a parametric model (typically, the length, shape and size of the cross section, the spatial position and the orientation, etc.). Those parameters are then optimized by applying a gradient descent algorithm known per se. The energy to be minimized by the gradient descent algorithm can be a function of the difference between the image really acquired and the image which Would be obtained With a given choice of values of parameters of the stent model.

This second variant offers the advantage of directly reconstructing a segmented three-dimensional image of the stent.

Furthermore, in all cases, it may be preferable to apply a movement compensation algorithm in order to compensate for the wide movements of the stent due, for example, to the patient's respiration.

From a material standpoint, beside the standard camera equipment, a computer is provided, equipped with a screen and incorporating the different software of the invention, notably, matching, segmentation and reconstruction algorithms.

Various modifications in structure and/or steps and/or function may be made by one skilled in the art without departing from the scope of the invention.

What is claimed is:

1. A method of reconstruction of a three-dimensional image of an element of interest inserted in an object, comprising the steps of:
   a. a phase of acquisition of digital radiographic images by rotation of a camera around the object;
   b. a phase of marking the position of the inserted element of interest from each acquired image to each acquired image; and
   c. a phase of reconstruction of the three-dimensional image of the inserted element of interest from acquired images and positions of the inserted element of interest successively located in the successive images.

2. The method according to claim 1, wherein the reconstruction phase embraces a representation of the three-dimensional image from a grid of elementary volume elements and use of an iterative algebraic algorithm of image reconstruction.

3. The method of claim 1 wherein a parametric model of the inserted element of interest is used.

4. The method of claim 2 wherein a parametric model of the inserted element of interest is used.

5. The method of claim 1 further comprising the step of carrying out a segmentation phase of the reconstructed image to filter out noise and retain solely the useful representation of the object.

6. The method of claim 1 further comprising the step of reconstructing the image by selecting only the images which correspond to a precise instant of the cardiac cycle.

7. The method of claim 1 comprising the step of reconstructing the image by selecting images according to a physiological signal.

8. The method of claim 1 wherein the inserted element of interest is a vascular stent.

9. The method of claim 3 wherein the model comprises the parameters of length, shape, size of the cross-section, spatial position and orientation of the inserted element of interest.

10. The method of claim 4 wherein the model comprises the parameters of length, shape, size of the cross-section, spatial position and orientation of the inserted element of interest.

11. The method of claim 9 wherein the parameters are optimized by applying a gradient descent algorithm.

12. The method of claim 9 wherein the parameters are optimized by applying a gradient descent algorithm.

13. The method of claim 3 wherein the reconstruction of the images provides a segmented image of the inserted element of interest.

14. The method of claim 3 wherein the reconstruction of the images provides a segmented image of the inserted element of interest.

15. The method of claim 1 comprising the step of applying a movement compensation algorithm to compensate for movement of the inserted element of interest.

16. The method of claim 1 wherein prior to the undertaking the phase of acquisition a contrast medium is injected into the object.

17. The method of claim 1 wherein the phase of marking is undertaken in real time.

18. The method of claim 1 wherein the phase of marking predicts the position of the inserted element of interest from one image to the next.

19. The method of claim 1 wherein the phase acquisition is a single rotation of the camera.

* * * * *